May 29, 1934.   P. E. BAKER ET AL   1,961,095
RIM
Filed June 17, 1932
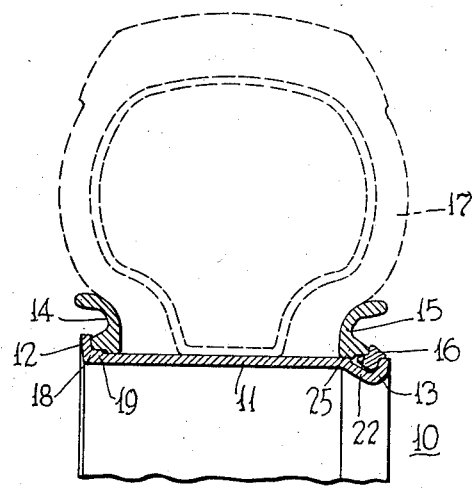
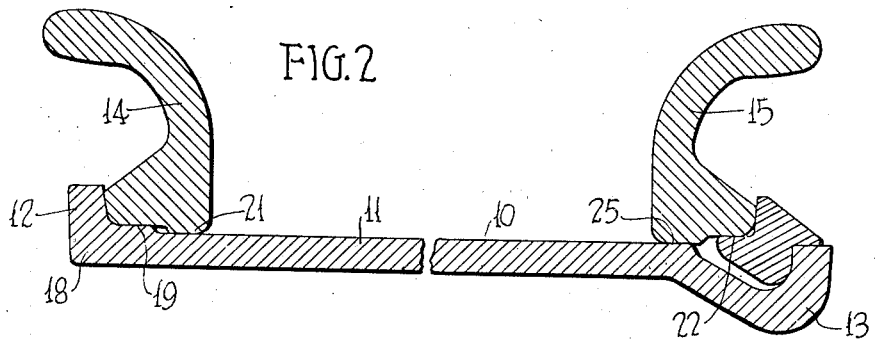
INVENTORS.
PAUL E. BAKER
CARL F. KOP
BY
John P. Tarbox
ATTORNEY.

Patented May 29, 1934

1,961,095

UNITED STATES PATENT OFFICE 1,961,095

RIM

Paul E. Baker and Carl F. Kop, Detroit, Mich., assignors to Budd Wheel Company, Philadelphia, Pa., a corporation of Pennsylvania Application June 17, 1932, Serial No. 617,812

4 Claims. (Cl. 301—10)

The invention relates to vehicle wheels and particularly to rims therefor.

Rims of the type with which we are concerned are known commercially as B. O. rims, which consist chiefly of a flat annular tire base terminating at one axial end thereof in a radially extending flange and at the other axial end in a gutter portion. The usual rim assembly consists of a pair of interchangeable tire retaining flanges, one abutting the flanged portion of the rim and the other secured by a ring of angular cross section fitting in the gutter portion. Considerable difficulty and trouble has been experienced due to rim breakage under normal high loading. This breakage has most usually occurred through the corner of the rim adjacent the base of the flange portion. Such breakage is not only dangerous, but expensive, often entailing the necessity of purchasing an entirely new vehicle wheel, inasmuch as rims are quite often secured permanently to the wheel bodies.

The prime object of our invention is the strengthening of tire rims in the region above described, in which the rims are subject to breakage. A secondary object is the provision of additional strengthening means on the usual rim locking ring, whereby to strengthen the same and to make the tire retaining flanges interchangeable.

Broadly, we have achieved the objects of our invention by increasing materially the thickness of the rim base and the locking ring adjacent those portions where the tire retaining flanges seat.

Other objects and advantages will be apparent after a reading of the sub-joined specification in light of the attached drawing, in which, Figure 1 is a detail cross sectional view of a vehicle tire and rim assembly embodying our invention.

Figure 2 is an enlarged view showing an improved form of our invention.

The strengthening of the rim base by increasing the thickness thereof entails some degree of difficulty, particularly where the added metal is localized in one portion of the rim, because of the fact that tire retaining flanges must be made interchangeable, one with the other, to avoid the necessity of carrying a multiplicity of different wheel parts. Difficulty is also encountered by virtue of the fact that the locking ring, being of standard size, is not adapted to suitably support a tire retaining flange which has modified to accommodate an enlarged tire base. These difficulties we have overcome in the present invention as clearly outlined in the specification below.

Referring now to the drawing by reference characters, the numeral 10 indicates generally the rim of the B. O. type. At this point is should be mentioned that our invention is not limited to this particular type of rim, and this specific reference for certain type of rims is made merely because the description will be aided thereby.

Rim 10 embodies a flat annular tire base 11 of considerable axial extent. A radially extending flange 12 of small extent is provided at one axial end of the tire base 11. At the other axial end the gutter portion 13 is provided. It is well understood in wheel practice that gutter portion 13 is provided in order to make the tire retaining flanges removable.

Tire retaining flanges 14 and 15, respectively, as applied to the flange side of the tire base 11 and the gutter portion 13, may be removed by spreading open the split locking ring 16 in order to remove it from the gutter portion. This spreading may be accomplished when the wheel tire 17 is in a deflated condition by displacing flange 15 axially inwardly of the rim in order to allow locking ring 16 to be expanded. The rim structure thus far described comprises part of the prior art and is no part of our invention.

As mentioned heretofore, some difficulty has been encountered because of the breakage of rims through the region indicated generally by numeral 18. It will be seen that this region is practically at the juncture between the tire base 11 and the radially extending flange 12. In several instances the radial flanges 12 have been known to break off completely, causing the tire 17 to be dislodged laterally. To prevent such breakage we have strengthened the rim base in this region of former breakage by providing an annular portion or land 19 on the tire base adjacent the radial flange 12. This land is preferably annular in extent and comprises essentially a thickened portion of the tire base 11. We have preferred to confine this enlarged portion 19 to a relatively small portion of tire base for purposes hereinafter to be made apparent. Locking ring 14 is normally seated on a continuous base portion 20 as indicated in Figure 3. By the addition of land 19 we have altered somewhat the normal tire retaining flange seating condition, and in order to provide a seat for this flange we have provided a stepped portion on the inner diametral edge thereof. This stepped cross section involves the use of a downwardly projecting land 21 on the base of tire retaining flange 14, the radial height of which land corresponds to the height of the annular reinforcing portion 19 and the rim base. As shown clearly in Figure 2, the tire retaining flange 14 is seated on two different diametral regions.

In order to additionally strengthen locking ring 16, and to make tire retaining flanges 14 and 15 interchangeable, a similar provision is made, whereby an annular land 22 of a depth equal to the depth of the land 19 is added to the locking ring 16. Here again a wheel retaining flange 15 formerly was seated on a portion of the rim base at 23 and a corresponding portion 24 of equal diameter on the locking ring 16, as in Figure 3. Obviously, the addition of land 22 on locking ring 16 gives it additional strength and to accommodate land 22 we provide a downwardly projecting annular land 25 on the inner diametral surface of tire retaining flange 15. By this provision we have made tire retaining flanges 14 and 15 reversible and interchangeable.

It will be seen that the addition of lands 19 and 22 on the tire base and locking ring respectively serve to measurably strengthen these regions without unduly increasing the weight, as borne out in actual practice. Rims made in accordance with our invention have been found to have a very much increased service life, with absolutely no breakage. Inasmuch as land 19 extends actually on tire base 11 a distance less than the width of tire retaining flange 14, we are able to provide a stepped seat for this flange and thereby make it interchangeable with the tire retaining flange 15 normally seated on the tire base 11 and land 22 of locking ring 16. The objects of our invention have been achieved in full by such provision for strength and interchangeability.

Modifications of the invention will be obvious to those skilled in the art, and the appended claims therefore should be read with a breadth of understanding commensurate with the generic spirit of our invention.

What we claim is:

1. A rim including, in combination, a tire base, a gutter portion at one end of said tire base, a flange at the opposite end of said tire base, a locking ring fitting in said gutter portion, said ring and said flange being arranged to retain a pair of interchangeable tire retaining flanges on said tire base, and annular shouldered portions on said tire base and on said locking ring, said tire retaining flanges being arranged to seat on said shouldered portions independently of the flange at one axial end of said base portion.

2. A rim including, in combination, a tire base, a gutter portion at one end of said tire base, a fixed flange at the opposite end of said tire base, a locking ring fitting in said gutter portion, said ring and said flange being arranged to retain a pair of interchangeable tire retaining flanges on said tire base, and annular portions on said tire base and on said locking ring, said tire retaining flanges being arranged to seat on said annular portions independently of the tire base fixed flange portion.

3. A rim combination comprising a tire base, a flange portion defining one axial limit thereof, and a gutter portion defining the other axial limit thereof, plural interchangeable tire retaining flanges arranged for seating adjacent the axial limits of said tire base, a locking ring arranged to fit in said gutter portion to lock one of said tire retaining flanges upon said tire base, and an axially and radially extending annular portion abutting said limit flange and base portions of said tire base, a corresponding annular portion on said locking ring, and an annular slot in said tire retaining flanges arranged for cooperative interchangeable seating upon the annular portions of said tire base and said locking ring.

4. A rim combination comprising a rim member having a tire base portion, the opposite axial limits of said portion being defined respectively, by a flange at one side and a gutter at the other, interchangeable removable tire retaining flanges arranged to seat upon said rim member adjacent the axial extremities thereof, an annular seat of intermediate diameter adjacent said flange and base portion, a ring arranged for cooperation with said gutter and to retain one of said tire retaining flanges, said ring having a stepped portion providing an annular seat of diameter intermediate said tire base and outer ring diameters, and annular grooves in said removable interchangeable tire retaining flange members arranged to cooperate with the annular seats on said ring and tire base portions, the seat at the flange side of said rim member being a separate portion from the fixed flange thereon per se.

PAUL E. BAKER.
CARL F. KOP.